United States Patent [19]

Lee

[11] Patent Number: 5,504,635
[45] Date of Patent: Apr. 2, 1996

[54] DEVICE FOR ADJUSTING A TENSION ARM SPRING BIASING FORCE

[75] Inventor: Chang-Ho Lee, Incheon, Rep. of Korea

[73] Assignee: Daewoo Electronics Co., Ltd., Seoul, Rep. of Korea

[21] Appl. No.: 279,775

[22] Filed: Jul. 25, 1994

[30] Foreign Application Priority Data

Jul. 31, 1993 [KR] Rep. of Korea ................ 1993-14882

[51] Int. Cl.⁶ .................................................. G11B 15/43
[52] U.S. Cl. ........................... 360/95; 360/85; 242/334.6
[58] Field of Search ............................... 360/96.1, 96.3, 360/95, 85, 74.3; 242/334, 334.6

[56] References Cited

U.S. PATENT DOCUMENTS

| | | | |
|---|---|---|---|
| 4,943,874 | 7/1990 | Takeda et al. | 360/85 |
| 5,070,422 | 12/1991 | Sasaki et al. | 360/85 |
| 5,093,752 | 3/1992 | Sato et al. | 360/85 |
| 5,305,162 | 4/1994 | Kushiro et al. | 360/85 |

FOREIGN PATENT DOCUMENTS

| | | | |
|---|---|---|---|
| 58-196648 | 11/1983 | Japan | 242/334.6 |
| 60-000642 | 1/1985 | Japan | 242/334.6 |
| 60-223051 | 11/1985 | Japan | 360/74.3 |
| 61-029445 | 2/1986 | Japan | 360/96.3 |
| 3-228244 | 10/1991 | Japan | 242/334.6 |
| 3-252951 | 11/1991 | Japan | 360/74.3 |

*Primary Examiner*—Stuart S. Levy
*Assistant Examiner*—Craig A. Renner
*Attorney, Agent, or Firm*—Anderson Kill Olick & Oshinsky

[57] ABSTRACT

A video cassette recorder is provided with a device for finely adjusting the tension of a loaded magnetic tape, which comprises a tension arm rotatably pivoted at a deck of the recorder and having a tension pole secured thereto for exerting a pressing force on the tape, a coil spring fixed to the tension arm for biasing the tension arm to urge the tension pole against the tape, a slider movably engaged with an elongated slot of the deck and associated with the coil spring, and an adjusting knob rotatably mounted to the deck for actuating the slider along the elongated slot in a lateral direction. The slider includes a rack formed at a side surface thereof. The adjusting knob includes a pinion provided on a shaft thereof and meshed with the rack of the slider. With a lateral movement of the slider caused by the rotation of the adjusting knob, the biasing force of the coil spring exerted against the tension arm is varied to adjust the pressing force of the tension pole applied to the tape.

2 Claims, 3 Drawing Sheets

DEVICE FOR ADJUSTING A TENSION ARM SPRING BIASING FORCE

FIELD OF THE INVENTION

The present invention relates to a magnetic tape tension adjusting mechanism; and, more particularly, to a device for adjusting the tension of a magnetic tape loaded in a video cassette recorder ("VCR") so as to maintain the tape in a predetermined contact relationship with a head drum of the VCR during the running operation of the tape.

DESCRIPTION OF THE PRIOR ART

In general, a videotape loaded in a VCR travels along a given path provided on a deck of the VCR and comes in contact with a head drum to record video information thereon or reproduce recorded information therefrom. However, loosening of the videotape during the operation of the VCR may cause operational failures, noises and/or distortions as the tape may not maintain a proper contact with the head drum. Therefore, in order to prevent such failures, the magnetic tape loaded needs to be maintained in a proper pressure contact with the head drum. To this end, a reverse force against the forward running of the tape is provided to maintain the tension and pressured contact of the tape with the head drum.

A typical tape tension adjusting device for use in a VCR is shown in FIG. 1. The VCR shown therein includes a deck 2, a supply reel base 4 rotatably mounted on the deck 2, and a head drum 6 rotatably coupled to the deck 2. A magnetic tape T drawn out of a supply reel 7 of a video cassette loaded in the VCR runs along an eraser head 8, a guide post 10 and the drum head 6, etc., and then is wound over a take up reel of the cassette (not shown).

As shown in FIG. 1, disposed between the supply reel base 4 and the head drum 6 is a tape tension adjusting device 12 which serves to adjust the tension of the loaded tape T in a required level. The adjusting device 12 comprises a tension arm 14, one end of which is rotatably pivoted at the deck 2 by a pin 16 and the other end of which includes a tension pole 18 secured thereto for pressing the tape T. In addition, fixed to the one end of the tension arm 14 is a coil spring 20 which urges the tension arm 14 in a counterclockwise direction about the pin 16, thereby causing the tension pole 18 to push the tape T. The deck 2 is provided with a plurality of hooks 22 arranged in a given interval, one of which is selectively engaged with the coil spring 20.

According to the prior art adjusting device, if it is required to adjust the tension of the tape T, the engagement of the coil spring 20 with one of the hooks 22 will cause the tension arm 14 to rotate clockwise or counterclockwise about the pin 16, increasing or alleviating the tension force applied to the tape T through the movement of the tension pole 18. However, this adjusting device has a deficiency in that the interval arrangement of the hooks 22 on the deck 2 renders it difficult to finely adjust the tension of the tape or to achieve a precise contact of the tape with the head drum. Further, repeated separation and engagement between the coil spring and each one of the hooks is required to adjust the tension of the tape, which may cause a premature failure of the device.

SUMMARY OF THE INVENTION

Accordingly, it is an object of the present invention to provide an adjusting device for use in a VCR, which is capable of finely adjusting the tension of a magnetic tape loaded in the VCR to maintain a precise contact of the tape with a head drum of the VCR.

It is another object of the present invention to provide an adjusting mechanism which is designed to adjust the tension of a loaded magnetic tape with ease and convenience.

The above and other objects of the present invention are accomplished by providing a magnetic tape tension adjusting device for a VCR, which comprises:

a tension arm rotatably pivoted at a deck of the VCR at a first end portion thereof and having a tension pole secured to a second end portion thereof for exerting a pressing force on a loaded magnetic tape in the VCR;

means fixed to the first end portion of said tension arm for biasing said tension arm to urge said tension pole against the magnetic tape;

a slider movably engaged with an elongated slot of the deck and associated with said biasing means; and means for actuating said slider along the elongated slot in a lateral direction to adjust the pressing force of said tension pole applied to the magnetic tape through a biasing force variation of said biasing means caused by the movement of the slider.

In accordance with a preferred embodiment of the present invention, the slider includes a rack formed at a side surface thereof and is tightly coupled to the elongated slot of the deck to forcibly move in the lateral direction by the actuating means. Further, the actuating means includes an adjusting knob rotatably held in a hole of the deck and having a pinion meshed with the rack of the slider. Therefore, the rotation of the adjusting knob will cause the slider to properly move along the slot in a required lateral direction, thereby providing a fine adjustment of the tension of the tape by the rotating actuation of the tension arm. After the completion of the tension adjustment of the tape, the adjusting knob may be removed from the deck in accordance with another embodiment of the present invention.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE PREFERRED EMBODIMENTS

Figure 1:
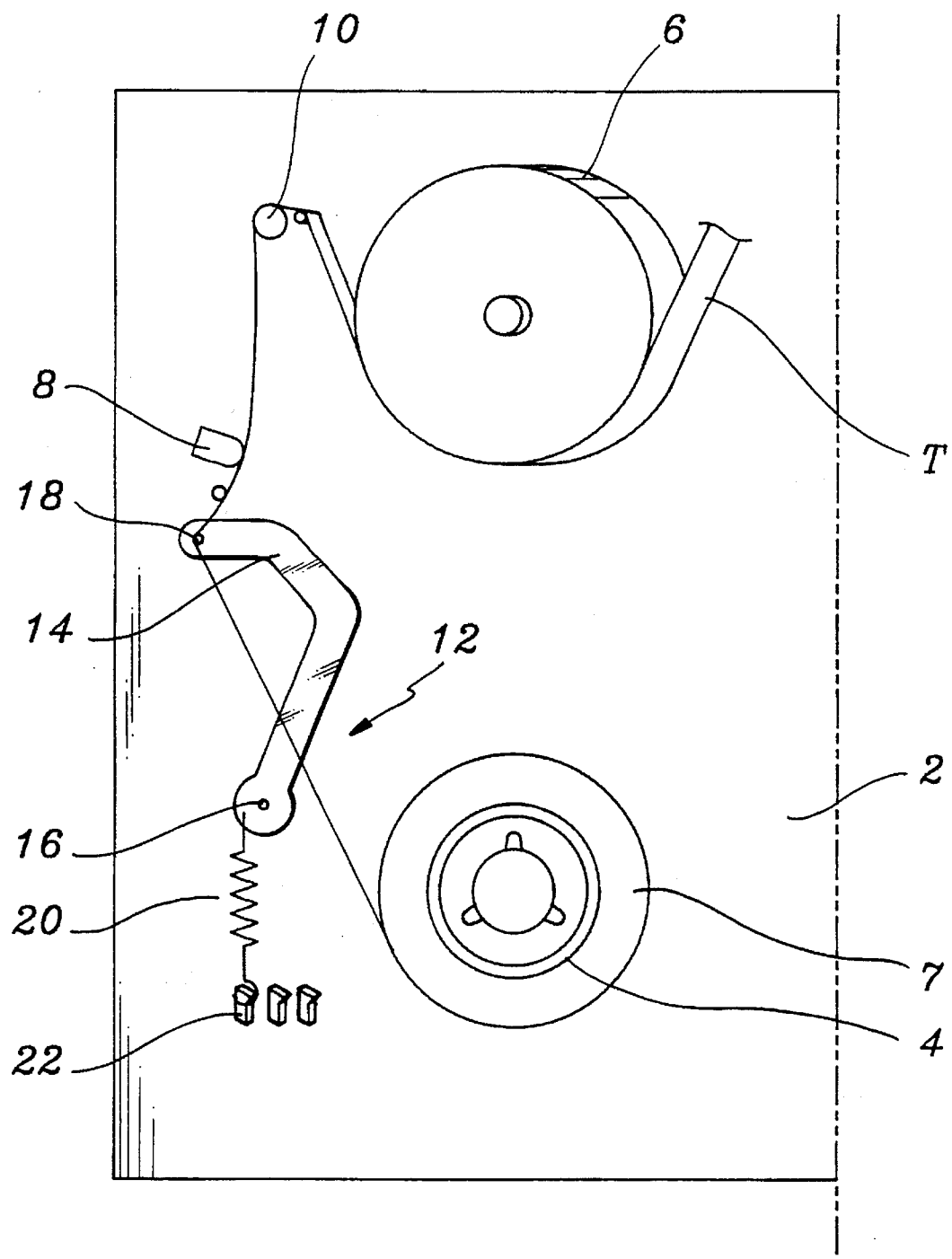
FIG. 1 is a plan view of a prior art device for adjusting the tension of a magnetic tape loaded in a VCR.
Figure 2:
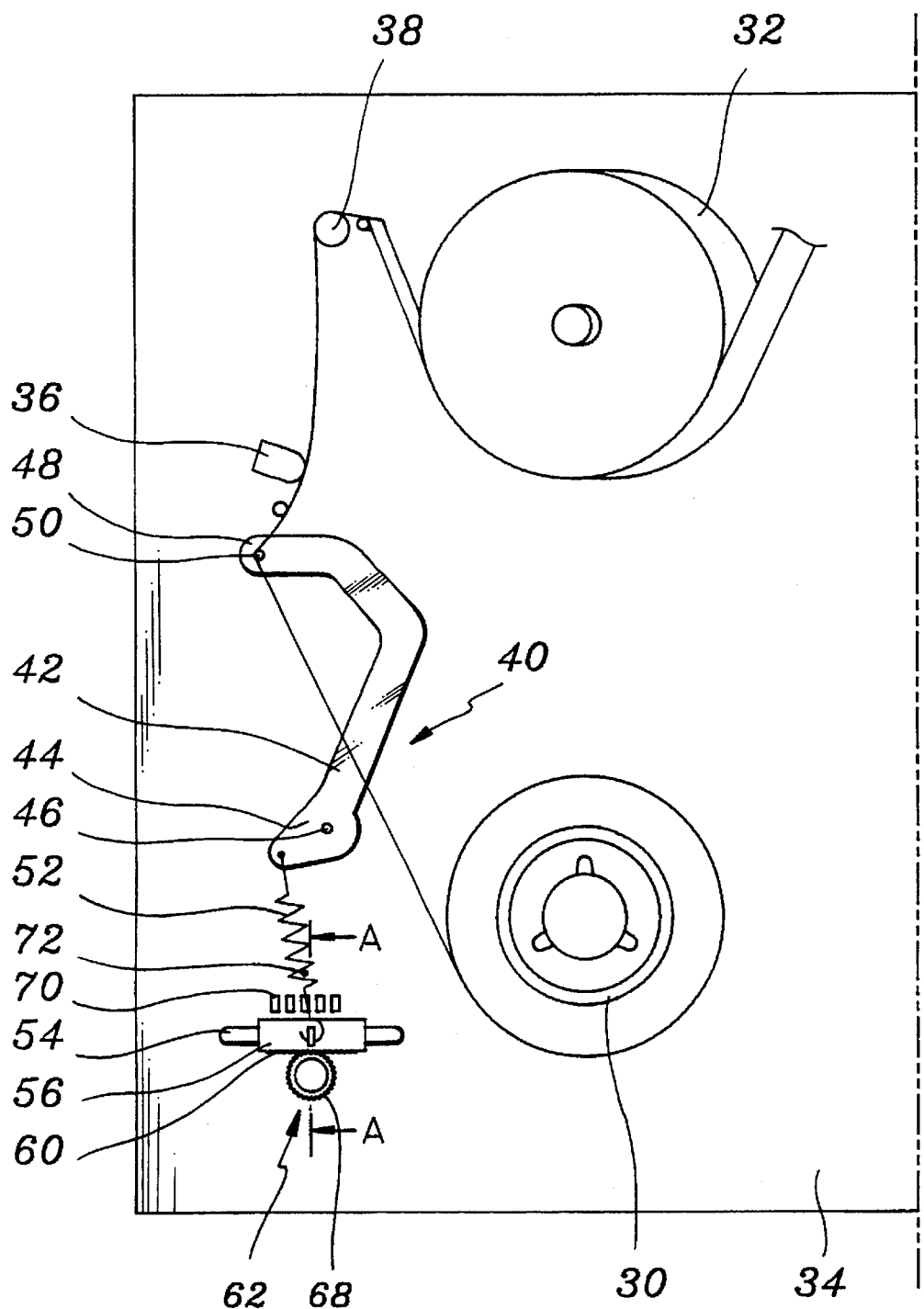
FIG. 2 is a plan view of a magnetic tape tension adjusting device for a VCR in accordance with a preferred embodiment of the present invention.

Referring now to FIG. 2, there is shown a magnetic tape tension adjusting device for use in a VCR in accordance with a preferred embodiment of the present invention. A supply reel base 30 and a head drum 32 are rotatably mounted on a deck 34 of the VCR in a spaced relationship with each other. A loaded magnetic tape T travels along a given path provided on the deck 34, i.e., along the path defined by an eraser head 36, a guide post 38, the head drum 32 and so forth.

As shown in FIG. 2, the magnetic tape tension adjusting device 40 is provided at a location between the supply reel base 30 and the head drum 32 so as to adjust the tension of the magnetic tape T loaded therein. The tension adjusting device 40 comprises a tension arm 42 located at the tape running path on the deck 34, one end portion 44 of which is rotatably pivoted at a pin 46 fixed to the deck 34 and the other end portion 48 of which includes a tension pole 50 secured thereto so as to exert a pressing force on the magnetic tape T, thereby preventing looseness of the tape. A coil spring 52 is engaged with the first end portion 44 of the tension arm 42 to bias the tension arm 42 counterclockwise about the pin 46, enabling the tension pole 50 to press the tape T.

As depicted in FIG. 2, an elongated guide slot 54 is provided at the deck 34 in a lateral direction and spaced from the tension arm 42. A slider 56 is movably engaged with the elongated slot 54 of the deck 34. In addition, provided on the slider 56 is a hook 58 which is adapted to engage with the coil spring 52. The slider 56 includes a rack 60 formed at a side portion thereof.

Figure 3:
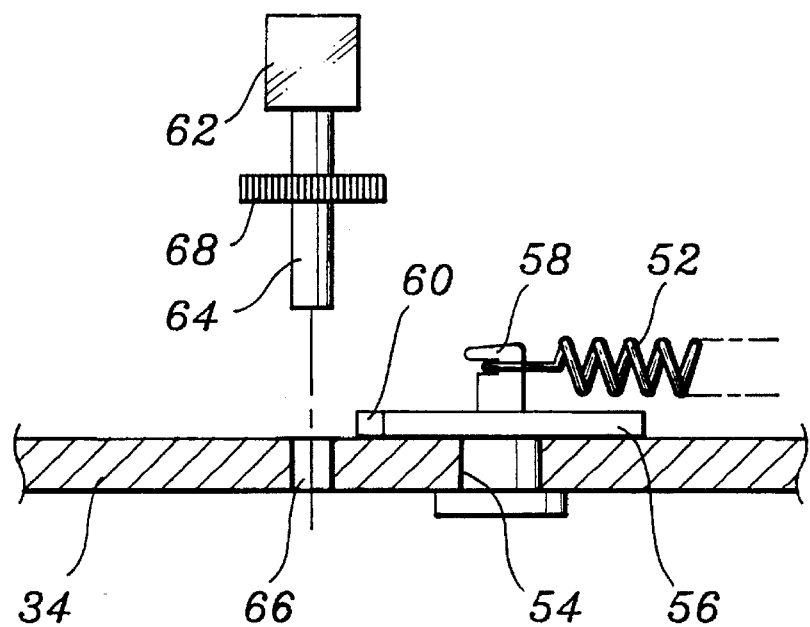
FIG. 3 is a sectional view taken along line A—A of FIG. 2.

As best shown in FIG. 3, rotatably mounted to the deck 34 is an adjusting knob 62 which is adapted to actuate the slider 56 along the elongated slot 54 in the lateral direction. The adjusting knob 62 includes a shaft 64 rotatably held in a hole 66 of the deck 34, and a pinion 68 provided on the shaft 64 and meshed with the rack 60 of the slider 56. Therefore, the slider 56 is moved along the elongated slot 54 in the right or left direction by a clockwise or counterclockwise rotation of the adjusting knob 62 to adjust the biasing force of the coil spring 52 applied to the tension arm 42. This causes the tension arm 42 to be rotated clockwise or counterclockwise about the pin 46 due to a variation in the biasing force of the coil spring 52, thereby adjusting the pressing force of the tension pole 50 exerted on the magnetic tape T. As a result, the tension of the tape T is adjusted in a required level to maintain an accurate contact of the tape T with the head drum 32 during the running operation of the tape. In particular, meshing of the pinion 68 of the adjusting knob 62 with the rack 60 of the slider 56 accomplishes a fine adjustment of the biasing force of the coil spring 52 against the tension arm 42, maintaining the required tension of the tape T; and renders it easy to adjust the tension of the tape.

On the other hand, it is required that the slider 56 remain to be stationary at a set position of the elongated slot 54 without moving in any lateral direction after the completion of the tension adjustment of the tape. To this end, the slider 56 is tightly coupled to the slot 54 of the deck 34 so that it is forcibly moved in the lateral direction by an external force, i.e., the rotating force of the adjusting knob 62. Preferably, the adjusting knob 62 may be separably engaged with the hole 66 of the deck 34 so that it may be removed from the deck 34 after the tension adjustment of the tape has been finished (see FIG. 3).

Referring back to FIG. 2, formed on a surface of the deck 34 and arranged adjacent to the slot 54 are a plurality of indication scales 70 which indicate various tension levels of the tape so as to visibly determine a required amount of movement of the slider 56, thereby facilitating the tension adjusting process of the tape. Further, a mark 72 may be preferably incised at one of the scales 70 in order to establish an initial setting position of the slider 56 in the slot 54.

Figure 4:
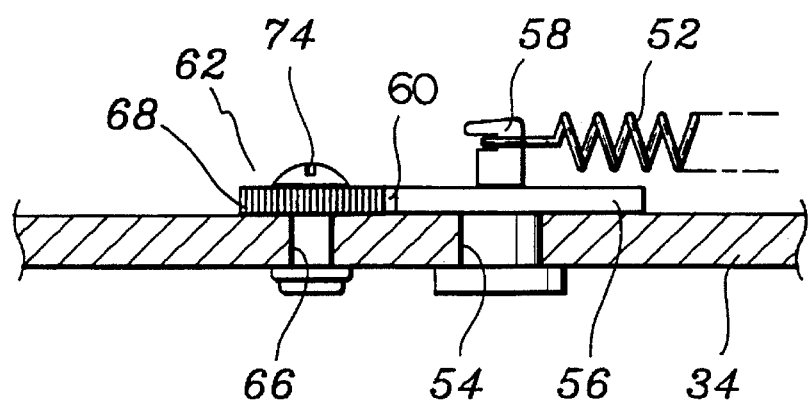
FIG. 4 is a view similar to that of FIG. 3 but illustrates an alternative tension adjusting mechanism of the present invention.

FIG. 4 shows an alternative tension adjusting mechanism of the present invention, which is similar to the one illustrated in FIG. 3 with the exception of the attachment of the adjusting knob 62 to the deck 34. In this embodiment, the adjusting knob 62 is undetachably engaged with the hole 66 of the deck 34 to actuate the slider 56 by its rotation. Additionally, formed at the top surface of the adjusting knob 62 is a crossed groove 74 which is adapted to engage with a hand tool, e.g., a driver (not shown) in the tension adjustment of the tape. Accordingly, with the rotation of the adjusting knob 62 by the tool, the slider 56 is moved along the elongated slot 54 in the lateral direction to adjust the tension of the tape in the above mentioned manner.

Although the invention has been shown and described with respect to the preferred embodiments, it will be understood by those skilled in the art that certain changes and modifications may be made without departing from the spirit and scope of the invention as defined in the following claims.

What is claimed is:

1. A device for adjusting the tension of a magnetic tape loaded in a video cassette recorder, comprising:

a tension arm rotatably pivoted on a deck of the recorder at a first end portion thereof and having a tension pole secured to a second end portion thereof for exerting a pressing force on the magnetic tape loaded in the recorder;

a spring fixed to the first end portion of said tension arm for biasing said tension arm to urge said tension pole against the magnetic tape;

a slider secured to an end of the spring and tightly fitted into an elongated slot of the deck for adjusting the biasing force of the spring by a lateral movement of the slider, said slider including a rack formed at a side surface thereof;

an adjusting knob rotatably mounted to the deck and having a pinion meshed with the rack of the slider, wherein said slider is forcibly moved in the lateral direction along the elongated slot by the rotation of the adjusting knob to finely control the biasing force of the spring against the tension arm, adjusting the pressing force of the tension pole applied to the magnetic tape; and a series of indication scales formed on a surface of the deck and arranged adjacent to the elongated slot for indicating various tension levels of the tape.

2. The tape tension adjusting device of claim 1, wherein said adjusting knob is separably held in a hole of the deck.

\* \* \* \* \*